United States Patent [19]

Miles

[11] Patent Number: 5,438,671
[45] Date of Patent: Aug. 1, 1995

[54] METHOD AND SYSTEM FOR TRANSFERRING COMPRESSED BYTES OF INFORMATION BETWEEN SEPARATE HARD DISK DRIVE UNITS

[75] Inventor: John C. Miles, Austin, Tex.

[73] Assignee: Dell U.S.A., L.P., Austin, Tex.

[21] Appl. No.: 732,842

[22] Filed: Jul. 19, 1991

[51] Int. Cl.⁶ .............................................. G06F 13/00
[52] U.S. Cl. ................... 395/200; 364/231.1; 364/236.2; 364/239.2; 364/260; 364/DIG. 1; 395/404; 395/432; 395/497.01
[58] Field of Search ................ 395/200, 800, 275, 425, 395/500

[56] References Cited

U.S. PATENT DOCUMENTS

| | | | |
|---|---|---|---|
| 4,626,824 | 12/1986 | Larson | 340/347 DD |
| 4,730,348 | 3/1988 | MacCrisken | 375/122 |
| 4,823,333 | 4/1989 | Satoh | 369/84 |
| 4,862,411 | 8/1989 | Dishon | 364/952 |
| 4,902,881 | 2/1990 | Janku | 238/381 |
| 4,994,963 | 2/1991 | Rorden | 395/325 |
| 5,155,845 | 10/1992 | Beal | 395/575 |
| 5,214,695 | 5/1993 | Arnold | 380/4 |
| 5,335,338 | 8/1994 | Proesel | 395/500 |

Primary Examiner—Eric Coleman
Attorney, Agent, or Firm—James Huffman; Kevin Daffer

[57] ABSTRACT

A two-computer system and method wherein data is transferred between the computers as complete disk images rather than as files. The transfer is made between the parallel ports of the two computers, for greater speed; amd RLL data compression is used to increase the effective rate of data transfer.

23 Claims, 4 Drawing Sheets

LIFELINE STANDARD PROCEDURE USING LPT1

LIFELINE SERVICE PROCEDURE USING BOTH LPT1 AND COM1

METHOD AND SYSTEM FOR TRANSFERRING COMPRESSED BYTES OF INFORMATION BETWEEN SEPARATE HARD DISK DRIVE UNITS

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTION

The present invention relates to methods for transferring data rapidly between computer systems, and to computer systems which are configured for rapid backup and/or data transfer operations.

Laptop and Smaller Computers

Portable personal computers were introduced in the early 1980s, and proved to be very useful and popular. As this market has developed, it has become increasingly dear that users strongly desire systems to have small volume, small weight, physical durability, and long battery-powered lifetime. Thus, small portable computers ("laptop" computers) have proven extremely popular during the late 1980s. Users continue to demand more features, longer time between recharges, and lower weight and volume. This combination of demands is difficult to meet. Moreover, as of 1990, another smaller generation of portable computers has begun to appear, referred to as "notebook" computers. This smaller form factor will only exacerbate the difficulty of the above tradeoffs.

As small portable computers have developed, the quality of the keyboard input has declined. The quantities of mass storage available on portables have steadily increased, but the cost per byte of the necessary ruggedized drives continues to be far above that of that of the drives normally used. This disparity seems likely to continue. Similarly, although some small portables use nonvolatized solid-state memory to replace disk drives, the cost per byte of such nonvolatized memory is likely to continue to exceed that of conventional mass storage devices.

As small portable computers become ever more common, an increasing number of users prefer to use two computers: one for their desktop, and one more for the road.

One problem which arises is loss of file coherency: when a user edits a file on his secondary machine, he must transfer that file back to his primary machine before he again edits the same file on the primary machine.

A closely related problem is one of backup: portable computers are inherently more susceptible than desktop computers to accident, loss, and theft.

Computer-to-Computer Data Transfer Methods

A number of products have become very popular for transferring data between two personal computers. The best-known of these products is Laplink TM, but a host of others are also currently available.

All such products are believed to be file-based: once the selection of some or all files has been made, the software in the sending computer retrieves files in the normal way from disk, and the software in the receiving computer receives stores corresponding files to disk in the normal way. This is very convenient, since this matches the user's usual view of his data. Moreover, many of these programs offer file-selection criteria, which the user can use to pick files from a menu, or by archive bit or date of revision, etc.

The Integrated Drive Electronics (IDE) Disk Interface

In recent years, interfacing to hard disk drives has been greatly simplified by the rapid adoption of the IDE interface[1]. See generally Alford, "The IDE Hard Disk Drive Interface," Byte magazine, March 1991 (vol. 16 No. 3), at 317ff, which is hereby incorporated by reference.

[1] This same interface is also referred to as the "ATA" interface, and has been proposed for adoption as an ANSI standard.

Data Compression Generally

In general, unpredictable data cannot be compressed without loss of precision. However, many types of commonly-used data blocks are not perfectly random. In a typical personal computer disk, the file definitions and formatting often cause the actual data on disk to contain large blocks of repeating characters. Many programs create files which include long strings of zeroes; and a freshly formatted disk will include large blocks of $F6_H$ bytes. To the extent that such repetition exists, the data is not perfectly random, and can be compressed.

A wide variety of techniques have been developed for data compression. A popular, and very simple, algorithm is known as "RLL" (run-length-limited) compression. This algorithm achieves significant compression of any data stream which contains long chains of repeated bytes, and has the advantage that it will not produce a compressed output which is significantly longer than the input (as some algorithms will).[2]

[2] Under worst-case conditions, RLL can produce a "compressed" output which is as much as 1% longer than the uncompressed input. However, RLL compression commonly produces a net compression of 10% to 50% on typical hard-disk contents.

Data Structures in Hard Disk Organization

In addition to the data actually stored, several other data structures are normally present on disk. These structures provide a framework to reliably identify the correspondence between files and the magnetic field domains on the disk medium. In DOS, these structures include a File Allocation Table (FAT) which is kept in a boot track (track 0/0), and the invention will be described with reference to a DOS environment. However, it should be noted that other data structures, with analogous purposes, are used under other operating systems (such as the HPFS[3] of OS/2).

[3] See generally Minasi, "Digging into HPFS," BYTE magazine Vol. 15 No. 5 (May 1990), at 109ff.

The Parallel Port in the ISA Architecture

A standard part of the ISA architecture is a parallel port which has a fairly standard definition. The pinout of this port, in the standard DB-25 connector, is shown in FIG. 4. See generally Dowden, INSIDE THE EISA COMPUTER (1990).

The parallel port interface may be envisioned as four separate parts (which, in current designs, are typically combined on a single chip):

Address decoding logic: monitors addresses on the ISA bus, and triggers the components accordingly if a match (to one of four addresses) is detected. When the IOR or IOW bus lines[4] are active, any of four addrH!ses can enable action by the parallel port.

In the standard ISA bus, these are status lines which indicate that a port input or output operation is taking place on the bus.

Send logic: when activated, takes the data on the bus and gives it to the physical input/output portion;

The physical input/output portion includes the line drivers and line receivers. In the standard port definition, the last value sent out as output is ORed with the data being read. This means that before data is read in, a logical zero must be sent out.

Receive logic makes the data from the input/output portion available to the bus when it is requested.

The standard use of the parallel port is to output quantities of data to a printer, and get back status signals from the printer. However, it is known that a parallel port can be used for fully bidirectional data transfer. See generally Greenberg, "Adapting the parallel port for bidirectional communication," *Microsoft Systems Journal* Vol. 5 No. 5 (Sept. 1990), at 107ff.

Innovative Rapid Data Transfer Method

The inventions disclosed in the present application provide a more rapid method for transfer of data between two computers, and provide an improved macro-architecture for combining laptop computers with stationary personal computers.

According to the present invention, data is transferred not as files, but as disk images. DOS (and many other operating systems) provide a low-level operation to retrieve data from a specified cylinder and sector of a hard disk.[5] This operation is faster than retrieving a specified file.

[5] As noted above, the IDE may actually translate this to a different location in the actual physical head positioning of the drive; but this translation is invisible to the CPU, and is consistent.

Thus, in the presently preferred embodiment, a complete image is transferred from one IDE disk to another. That is, the complete drive space is read out from the sending drive, and, for every legal combination of sending drive, the exact same data is written into cylinder X and sector Y on the receiving drive. Note that the receiving drive must be the same size as the sending drive (or at least no smaller).

The transfer is normally made over the parallel ports of both computers, for greater speed. Nevertheless, the data rate through the parallel port is still a limiting factor in data transfer. Therefore, for further speed, a compression procedure is used to accelerate the effective rate.

This is particularly advantageous as a way to backup a portable computer. The complete hard disk of the laptop can be imaged onto a hard disk in another computer.

IDE disks are strongly preferred for use of these teachings, because an IDE disk conceals its physical defect map from the host system.

Note, however, that while this procedure is fast and robust, it does have a significant limitation; all of the data on disk in the receiving computer will be destroyed (or at least will become inaccessible).

First Preferred System Implementation

One advantageous use of the disclosed innovative method is for replacement of portable computers. When a laptop develops a problem in service, disk image transfer is used to provide the replacement computer with exactly the same software (including program configuration options) as the old computer had. Thus, users see minimal disruption in their work processes.

Second Preferred System Implementation

Another advantageous use of the disclosed innovative method is for backup of a portable computer onto a hard disk in a stationary computer. In this class of embodiments, the stationary computer may have, for example, a fast 300 Mbyte disk as the main working disk, and a 40 Mbyte disk solely for backup of the laptop's contents. Whenever the laptop and the stationary computer are both idle, the contents of the laptop's disk can be rapidly imaged to the smaller disk in the main computer.

Once this disk imaging is performed, other software operations can be used, if desired, to sort through the file directory of the newly updated receiving disk, and selectively make transfers to the main working disk in accordance with the timestamp and archive bit of each file.

Operation as Background Process

It is contemplated that it may be advantageous, in the future, to permit background operation of the disk-image-transfer software. The presently preferred embodiment does not permit such background operation; but two kinds of background operation are possible:

with background operation on the receiving machine, a user can continue to work on the primary drive of his main computer, while the disk image is being uploaded to the backup drive on the main computer.

with background operation on the transferring machine, a user can continue to work on his laptop while it is uploading to the backup drive on the main computer. This is more difficult to implement with robustness against crashes. Care must also be taken to preserve data in the memory of the transferring computer.

Both of these backgrounding options are easier to implement in a multi-threaded operating system (such as OS/2 or UNIX); but of course, as is well known to those skilled in the art of DOS programming, it is also possible (with more difficulty) to implement multi-tasking operations in DOS. Thus, the disk-image-transfer software can watch for idle periods in the main program, do a context save, and steal CPU cycles to continue the backup operation until completed.

BRIEF DESCRIPTION OF THE DRAWING

The present invention will be described with reference to the accompanying drawings, which show important sample embodiments of the invention and which are incorporated in the specification hereof by reference, wherein.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

General Description

The Dell Lifeline TM program is designed to transfer the entire binary image of a hard-disk drive from one PC to another. It consists of a simple menu-driven user interface, several functions which call the IBM ROM BIOS disk access routines to read and write individual disk sectors, and a set of communications functions which compress, transmit, receive, and unpack the sector-image data which is to be transferred between the two systems.

Lifeline TM differs from commercial data-transfer products such as Laplink TM and FastWire TM, in that Lifeline TM transmits a true binary ima C copy of the data on the source drive, while the products mentioned above are useful only when transferring individual MS-DOS files, and cannot easily preserve low-level information such as file placement, volume labels, and partition tables. Additionally, Lifeline's run-length encoding algorithm provides a speed advantage when large amounts of data are to be transferred.

Hardware Configuration

Figure 1:
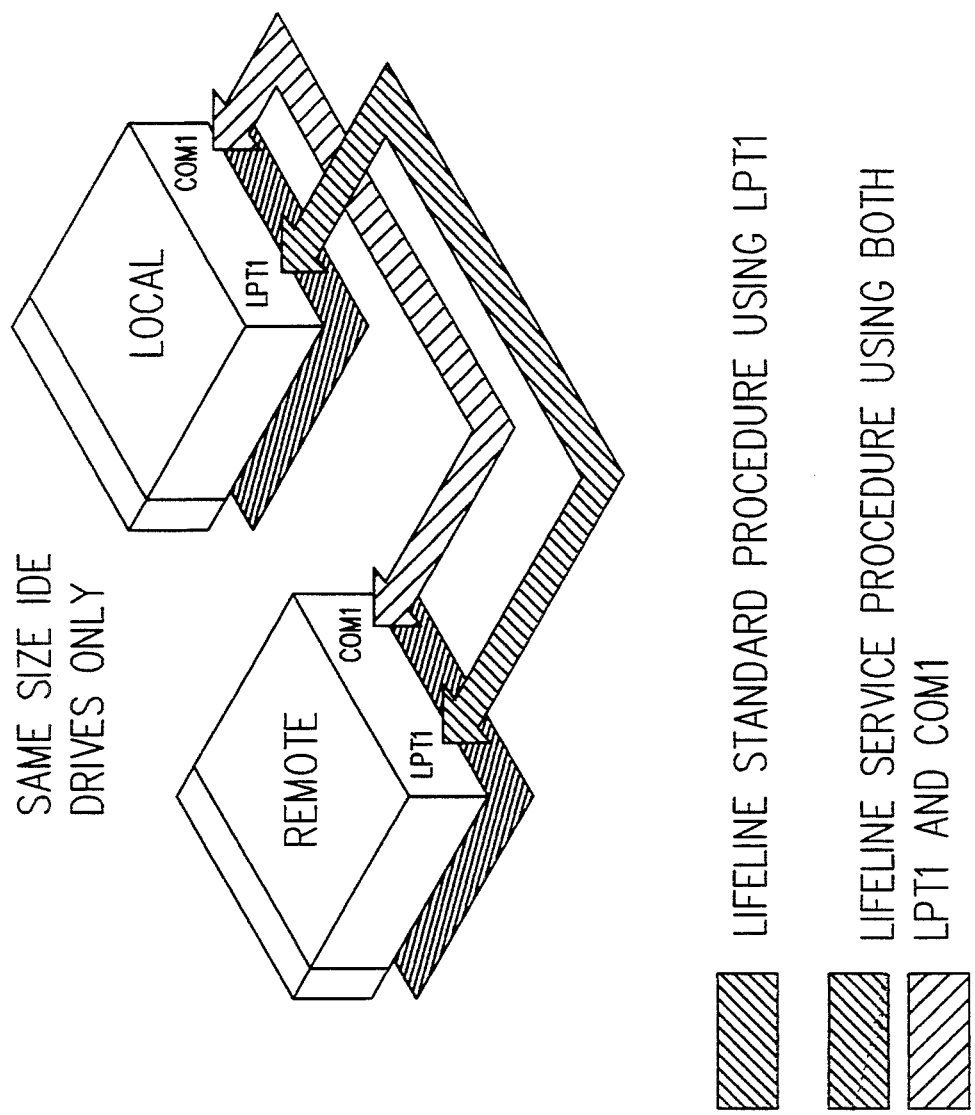
FIG. 1 schematically shows how two computers are connected together through their parallel ports, for exchange of data.

FIG. 1 schematically shows how two computers are connected together through their parallel ports, for exchange of data. In the presently preferred embodiment these may be any two "IBM-compatible" personal computers. (However, of course, the disclosed innovations can also be adapted to a wide variety of other small computer architectures.) One particularly advantageous class of embodiments transfers a disk image from one laptop or notebook (based on a 386SX chip or an 80C286) to another. Another particularly advantageous class of embodiments transfers a disk image from one laptop or notebook (based on a 386SX chip or an 80C286) to a secondary hard disk drive in a user's stationary personal computer (such as a 50-MHz 80486 machine with 40M and 300M drives).

The hookup shown also includes a serial port cable running between the two computers. This configuration is referred to, in the figure legend, as the "service" configuration. However, as detailed below, if both computers are fully operational, only the parallel port connection is needed.

Figure 4:
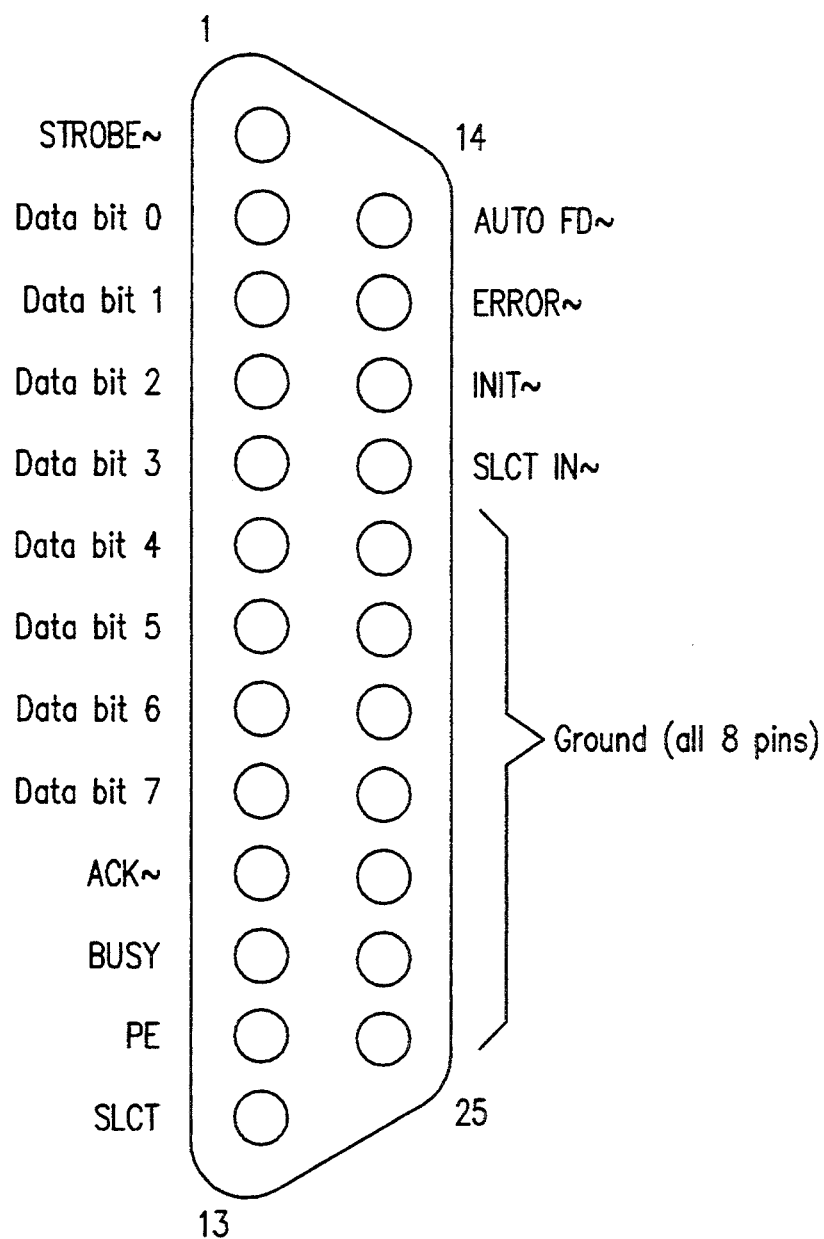
FIG. 4 is a pinout diagram of the standard DB-25 printer port pin assignments.

FIG. 4 is a pinout diagram of the standard DB-25 printer port pin assignments. The preferred cable makes some cross-connections in this pinout, as described below.

Overview

Lifeline is an MS-DOS application designed to transfer the entire contents of an IBM-compatible personal computer's IDE hard disk to an identical hard disk installed in another system. Its uses include quick, convenient transfer of a desktop PC's MS-DOS or OS/2 environment to a portable "second system," as well as rapid data backup for portable systems subject to field replacement.

Figure 2:
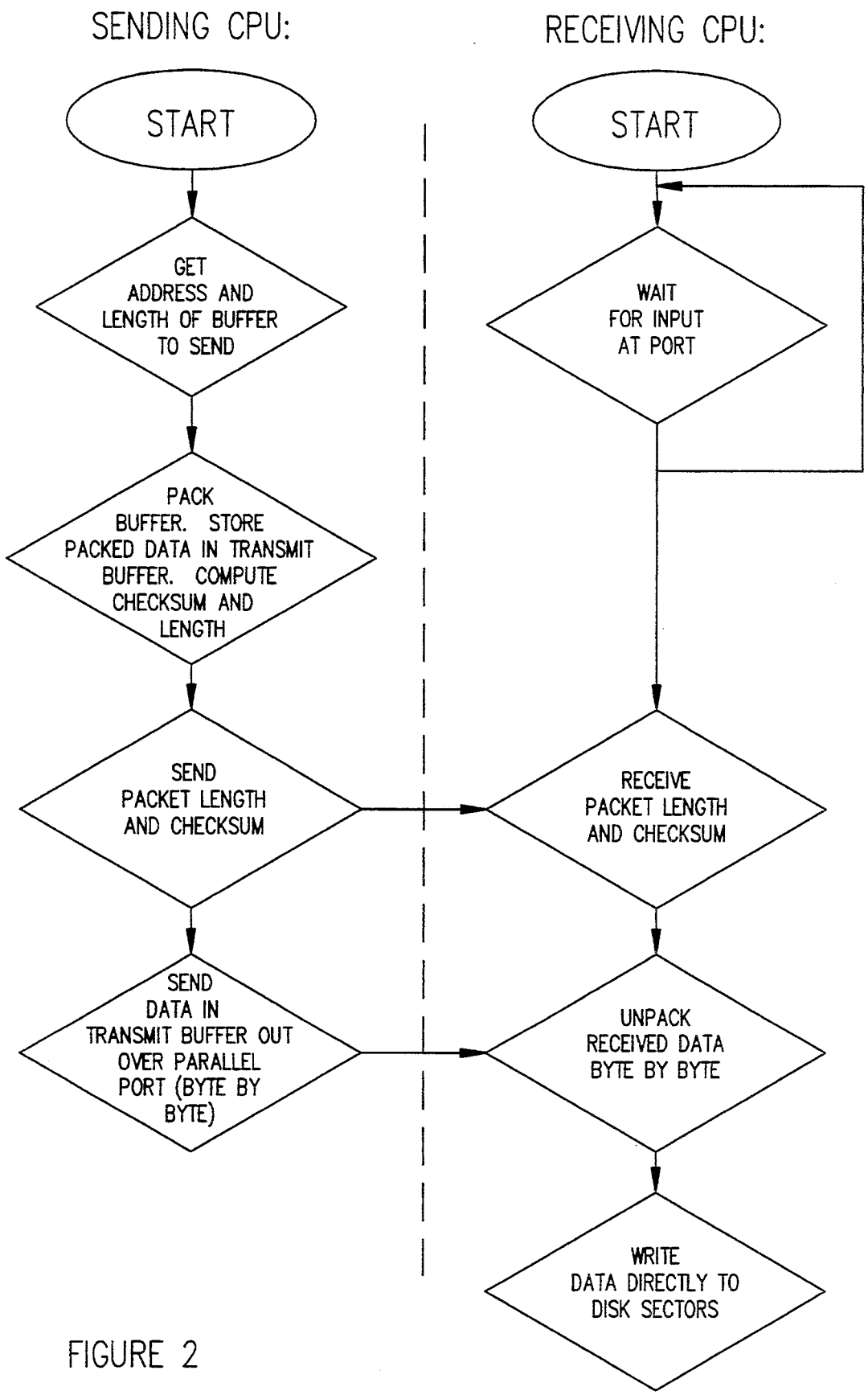
FIG. 2 is a flow chart showing key steps in the transfer of a disk image between computers.

FIG. 2 is a flow chart showing key steps in the transfer of a disk image between computers. The steps performed by the sending computer are shown on the left side, and steps performed by the receiving computer are shown on the right.

The sending computer initially gets the address and length of a buffer whose contents are to be sent. This data is obtained, in the presently preferred embodiment, by steps not shown in this flow chart, using low-level BIOS calls which command readout of specified disk sectors. These steps are shown in detail in the accompanying source code listing.

The sending computer's process then "packs" the data (i.e. compresses it using the RLL algorithm) and stores the packed data in a transmit buffer. A checksum is computed for the packed data, and the packed data's checksum and length are sent out over the parallel port. Thereafter, the data to be sent is transmitted over the parallel port, one byte at a time.

Initially, the receiving computer has been waiting to receive data. After it receives a length and checksum value, it can check the incoming data and store it in a received-data buffer. When the data in the received-data buffer matches the checksum and length, the process in the receiving computer can unpack that data, and store the results by a series of low-level disk write operations.

Figure 3:
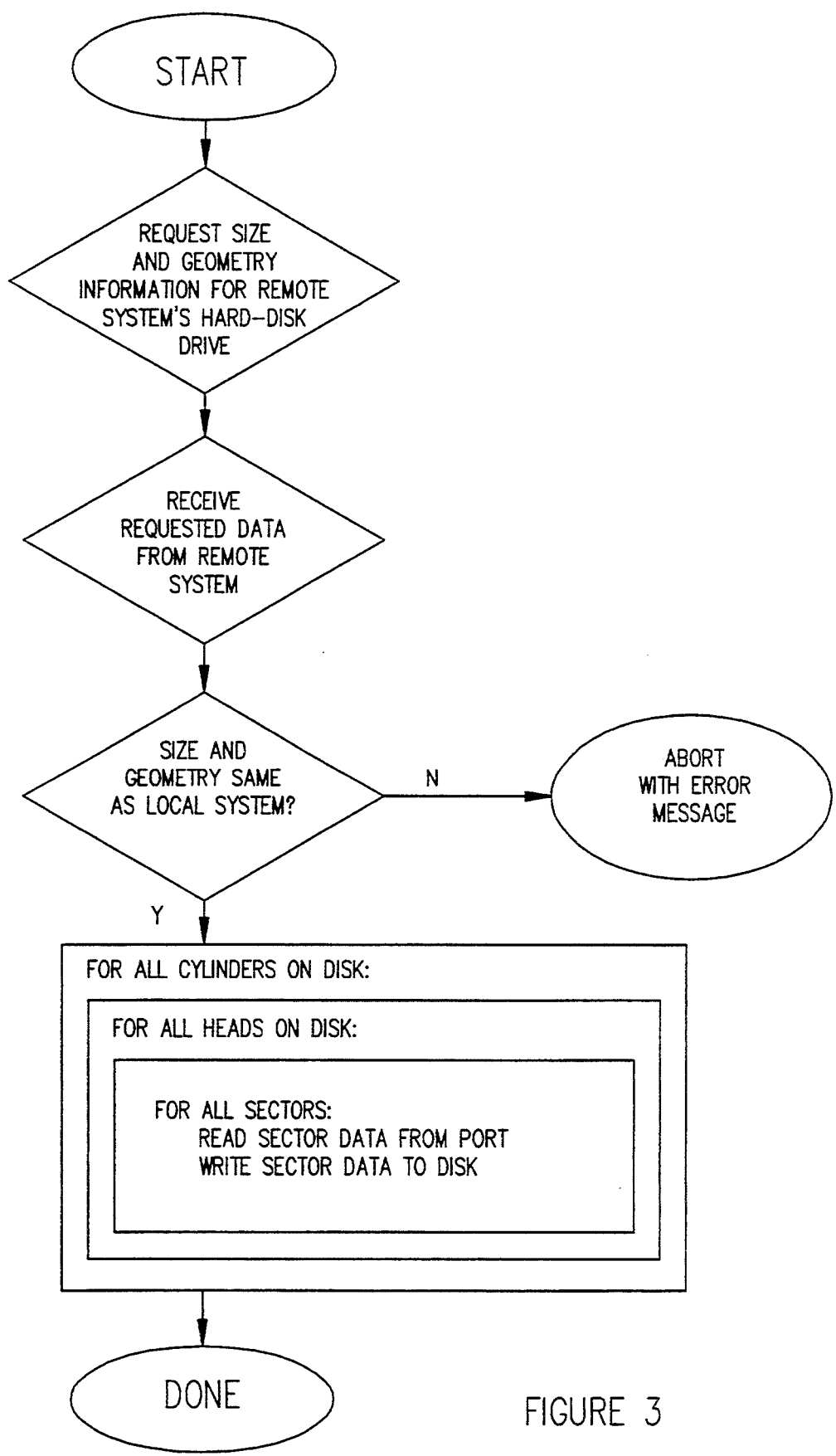
FIG. 3 is a more detailed flow chart, showing additional details of the steps performed by a computer which is receiving a disk image transfer.

FIG. 3 is a more detailed flow chart, showing additional details of the overhead steps performed by a computer which is receiving a disk image transfer. The disk parameters from the remote system are called up and checked, and the transfer is not allowed to proceed unless the disk parameters from the remote system match those from the local system.

Features

Backup time typically less than 25 minutes for 40 Mb hard disk

Data transfer via parallel port requires no peripheral cards or disassembly

Error correction with 4-byte checksums guarantees data integrity

Serial port "upload" capability copies program when floppy drive unavailable

Functional keyboard and display not required at remote system

Hard-disk read errors do not affect successful transfer of remaining data

Simple text-based menu interface minimizes chances of operator error

Functional Specification

1. Connect the Lifeline parallel cable to the primer ports of both the "local" and "remote" systems. (The "remote" system is the one whose hard-disk contents are to be transferred to the "local" system.)
2. Boot the Lifeline diskette on the remote system, if possible. Remove the diskette when the Lifeline program menu appears. If the remote system's floppy-disk drive is not operable, proceed to the next step.
3. Boot the Lifeline diskette on the local system, leaving it in the floppy disk drive when the Lifeline menu appears.
4. If the remote system does not have at least one working floppy-disk drive, it will be necessary to use the [U]pload command from the local system's Lifeline program menu. To transfer the Lifeline program directly to the remote system's hard disk, connect the COM1 serial ports on the two systems with the Lifeline serial cable. Then type 'U' at the local system's menu prompt, and carefully follow the onscreen instructions. After about ten seconds, the Lifeline program menu will appear on the remote system's display screen. If the remote system's hard disk does not contain a bootable MS-DOS partition, however, Lifeline's Upload capability cannot be used.
5. Type 'T' to select the [T]ransfer command at the local system's menu prompt. This will cause both systems to display the head, cylinder, and sector count, as well as the total capacity, of their respective hard disks. (Lifeline's cylinder count reports the number of cylinders actually used by the operating system to store data, and may not necessarily agree with the disk drive's hardware specification.) The two systems' hard disks must be identical in size; if not, the local system will exit to DOS with an error message.
6. A warning message will appear on the local system's display, indicating that any data currently present on the local system's hard disk will be replaced with a copy of the remote system's data. To continue, type the word 'GO' at the local system's input prompt and press Enter. Any other input will cancel the transfer operation.
7. The hard-disk data transfer will begin. A tone will sound at the local system when the hard-disk copy is complete. The [Q]uit to DOS option may then be used to exit Lifeline at either terminal, although the local system will exit to a completely different (and possibly hostile) environment than the one from which the Lifeline program was launched. It is recommended that the local system be rebooted immediately after a hard-disk data transfer.

Operating Notes

On a typical 80386-based system running at 20 megahertz, data will be copied from the remote system to the local system at approximately 1.7 megabytes per minute. All DOS or OS/2 files in all logical partitions will be transferred intact, along with the entire directory structure. If parts of the remote system's hard disk cannot be read, the rest of the data will still be transferred normally.

A single keystroke at either system will abort the transfer process, leaving the local system's hard-disk data in an unpredictable state. Any errors encountered while trying to write to the local system's hard disk will also cause the transfer to halt. The parallel cable should not be disconnected while Lifeline is still running on either system; this may result in one or both systems "hanging" endlessly, each waiting for the other to send valid data.

Sample User Interface Implementation

Following are samples of the screens actually used for user interface, in the presently preferred embodiment. Of course, these are not at all critical, and can be widely modified and varied.

The following screen is the top-level menu:

---
LIFELINE v1.02
---
Copyright (C) 1991 Dell Computer Corporation
Options:
[U]pload a copy of LIFELINE to remote PC
[T]ransfer contents of remote hard disk to this PC
[Q]uit to DOS
Which would you like? __

---

The following screen is displayed if the user chooses to upload the lifeline program itself to the remote system:

---
-- Upload LIFELINE to Remote PC --
---
1. Make sure the remote PC is connected to this system with both the parallel AND serial transfer cables!
2. Start MS-DOS at the command-line level (or select an OS/2 "DOS compatibility box") on the remote PC.
3. On the remote PC, insert a floppy disk or change to a hard-disk directory which has at least 35,000 bytes available.
4. Type the following commands at the remote PC's DOS prompt:
    MODE COM1:2400,E,8,1,P
    CTTY COM1.
You may press [ESC] on this system to abort the upload process and return to the main menu.

---

The following screen is an example of the display which the user will see on the local system if he chooses to transfer a disk image from the remote system:

---
-- Transfer Remote Hard Disk Data --
---
Heads: 5
Cylinders: 976
Sectors: 17
Total capacity: 42475520 bytes (40 Mb)
* DANGER *
All data on THIS SYSTEM's hard-disk drive will be OVERWRITTEN by the transfer process. DO NOT PROCEED if this is not acceptable&
Type GO to continue, or any other input to abort.
> go
Receiving hard disk data. Press any key to abort.
100% complete . . . Writing cylinder 976 of 976
Transfer successful.
Press any key to continue.

---

The following screen is an example of the display which the user will see on the remote system if he chooses to transfer a disk image:

---
-- Send Local Hard Disk Data --
---
Heads: 5
Cylinders: 976

```
-- Send Local Hard Disk Data --
            Sectors: 17
    Total capacity: 42475520 bytes (40 Mb)
Transmitting hard disk data. Press any key to abort.
100% complete . . . Reading cylinder 976 of 976
```

Sample User Instructions

The Dell Lifeline program makes it possible for the user to replace the entire contents of the hard-disk drive of one computer with the complete set of files, directories, and partitions from the hard-disk drive of another computer. Both hard-disk drives must be integrated drive electronics (IDE) drives that have the same capacity, and the same number of heads, cylinders, and sectors.

NOTE: The operation of the Lifeline program involves two computers. Throughout the following instructions, these are referred to as the remote computer and the local computer. The remote computer's hard-disk drive represents the source of the files that are transferred, while the local computer's hard-disk drive is the destination for these files.

In particular, the Lifeline program provides a quick, convenient method for backing up and restoring files on the hard-disk drive of a computer that requires service.

The Dell Lifeline kit contains:

Dell Lifeline Program Diskette: The Dell Lifeline Program Diskette is an MS-DOS(R) bootable diskette that contains the Lifeline program and its associated files. NOTE: The Lifeline program can be used to transfer data from an IDE drive that is formatted for use with MS OS/2, as long as the computer can be booted from the Dell Lifeline Program Diskette.

Lifeline parallel cable: The Lifeline program transfers data through the Lifeline parallel cable included in this kit.

Lifeline serial cable: If the remote computer cannot be booted from the Dell Lifeline Program Diskette, the user can transfer a copy of the Lifeline program from the local computer to the hard-disk drive of the remote computer through the Lifeline serial cable included in this kit. The Lifeline program starts automatically after it is transferred. NOTE: Naturally, the Lifeline program cannot be used with a computer that has a malfunctioning hard-disk drive or a faulty LPT1 parallel port. Other service-related situations may also make the Lifeline program an inappropriate method of hard-disk drive backup and restore.

Features

Notable features of the presently preferred embodiment of the Lifeline program include the following:

Provides a menu-driven user interface

Transfers data at a rate of 35–40 seconds per megabyte (MB)

Requires no disassembly or additional expansion cards

Operates in the absence of a fully-functional keyboard or display on the remote computer Can transfer a copy of the Lifeline program to the hard-disk drive of a computer that cannot be booted from the Dell Lifeline Program Diskette Transfers all recoverable data from a hard-disk drive that is damaged or contains corrupted files Assures data integrity through 4-byte checksum error detection.

Files

The Dell Lifeline Program Diskette contains the following files:

| | |
|---|---|
| command.com | MS-DOS command processor |
| autoexec.bat | Startup configuration file to automatically start Lifeline program |
| lifeboot.bin | Bootstrap file, used when a copy of the Lifeline program is transferred to the hard-disk drive of a computer that will not boot from the Dell Lifeline Program Diskette |
| lifeline.exe | Executable file for the Lifeline program |
| readme.doc | ASCII file of cable specifications and additional program information |

Running the Lifeline Program

The specific procedure for using the Lifeline program depends on whether the user can boot the remote computer from the Dell Lifeline Program Diskette.

Lifeline Standard Procedure

Use the Lifeline standard procedure when the user can boot both computers from the Dell Lifeline Program Diskette. Otherwise, the Lifeline service procedure should be used.

To use the Lifeline standard procedure, perform the following steps:

CAUTION: Any previously-stored data on the hard-disk drive of the local computer is completely overwritten when the user runs the Lifeline program.

1. Turn off all peripherals that are connected to either the local or remote computer.
2. Turn off the local and remote computers.
3. Disconnect any printers that are connected to the LPT1 parallel ports on both the remote and local computers.
4. Connect the Lifeline parallel cable to the LPT1 parallel ports on both the remote and local computers.
5. Insert the Dell Lifeline Program Diskette into the diskette drive of the remote computer.
6. Turn on the remote computer. When the following Lifeline top-level menu appears, do not select a menu option at this time.
7. Remove the Dell Lifeline Program Diskette from the diskette drive of the remote computer and insert it into the diskette drive of the local computer.
8. Turn on the local computer. The Lifeline top-level program menu appears on the local computer (as it did on the remote computer in step 6 earlier).
9. On the local computer, type t from the Lifeline program menu. On the screen of each computer, the Lifeline program now displays the statistics for the IDE drive, including Total storage capacity, and Number of heads, cylinders, and sectors. (NOTE: The Lifeline program's cylinder count reports the number of cylinders actually used by the operating system to store data. This number may not agree with the hardware specification of the IDE drive.) If the two IDE drives are not identical in size, an error message appears and the Lifeline program exits. Otherwise, a warning message appears on the screen of the local computer indicating that the user are about to replace the contents of its IDE drive with the data from the IDE drive of the remote computer.

10. On the local computer, type go at the Lifeline program's input prompt. The Lifeline data transfer process begins. When the contents of the local computer's hard-disk drive are replaced by the complete set of files from the remote computer, a tone sounds on the local computer and the following messages appear on the screen:

---
Receiving hard disk data. Press any key to abort.
XXX % complete . . . Writing cylinder XXX of XXX
Transfer successful.
Press any key to continue.
---

CAUTION: If you halt the Lifeline program before it completes, the data integrity of the local computer's hard-disk drive is no longer dependable. If you do not restart the Lifeline program, you must format the local computer's hard-disk drive.

11. On the remote computer, hold down the <CTRL><ALT> keys and press <DEL> to reboot the computer.
12. On the local computer, remove the Dell Lifeline Program Diskette from the diskette drive. Then hold down the <CTRL><ALT> keys and press <DEL> to reboot the computer. CAUTION: To avoid possible data corruption or loss, you must reboot the local computer after Lifeline data transfer.

Lifeline Service Procedure

Use the Lifeline service procedure when the user cannot boot the remote computer from the Dell Lifeline Program Diskette.

CAUTION: Any previously-stored data on the hard-disk drive of the local computer is completely overwritten when the user runs the Lifeline program.

To use the Lifeline service procedure, perform the following steps:

1. Turn off all peripherals that are connected to either the local or remote computer.
2. Turn off the local and remote computers.
3. Disconnect any printers that are connected to the LPT1 parallel ports on both the remote and local computers.
4. Disconnect any peripherals that are connected to the COM1 serial ports on both the remote and local computers.
5. Connect the Lifeline parallel cable to the LPT1 parallel port on both the remote and local computers.
6. Connect the Lifeline serial cable to the COM1 serial ports on both the remote and local computers.
7. Turn on the remote computer. The remote computer must display an MS-DOS system prompt. If the remote computer automatically starts a shell program or application program, exit to an MS-DOS operating system prompt. CAUTION: To use the Lifeline service procedure, the remote computer must be running under MS-DOS version 3.0 or above. The Lifeline service procedure will not operate if the remote computer boots MS OS/2 from its hard-disk drive.
8. Insert the Dell Lifeline Program Diskette into the diskette drive of the local computer.
9. Turn on the local computer. The Lifeline program menu appears.
10. On the local computer, type u at the blinking cursor below the Lifeline program menu. Upload instructions appear below the Lifeline program menu.
11. On the remote computer, type dir at the MS-DOS system prompt. Verify that at least 35,000 bytes of free space is available to hold the uploaded copy of the Lifeline program files.
12. At the MS-DOS system prompt on the remote computer, type:

MODE COM1:2400,E,8,1,P

CTTY COM1 or d:\ path\ MODE COM1:2400,E,8,1,P

CTTY COM1 where d:\ path \ is the subdirectory path to the MS-DOS mode command.

The Lifeline program menu appears on the remote computer's screen after approximately 10 seconds.

13. Follow steps 9 through 12 of the Lifeline Standard Procedure listed above.

Preferred Cable Specifications

In the presently preferred embodiment, special versions of both parallel and serial cables are provided for use with the Lifeline program.

Serial Cable

The serial cable, used to transfer a copy of the Lifeline program to the "bad" machine in the event of a floppy drive malfunction, is a null modem cable with a 9-hole D-shell connector at each end. It may be unshielded if less than six feet long. Recommended length is two to three feet. This cable may not be available "off the shelf," but may be assembled with readily available components. Required are a female-to-male DB-9 extension cable, a "null modem" block, and whatever gender changer is necessary to produce a female-to-female DB-9 null modem cable. When fabricated, the Lifeline serial cable must have the following properties:

| Serial Cable: DB-9 female to DB-9 female, less than 6 feet (1.8 meters) in length, Shielding optional | | |
|---|---|---|
| Pin # | Pin # | RS232C Signals |
| 2 | 3 | (RxD . . . TxD) |
| 3 | 2 | (TxD . . . RxD) |
| 4 | 6 | (DTR . . . DSR) |
| 5 | 5 | (GND . . . GND) |
| 6 | 4 | (DSR . . . DTR) |
| 7 | 8 | (RTS . . . CTS) |
| 8 | 7 | (CTS . . . RTS) |
| All other pins must be left unconnected at both ends. | | |

Parallel Cable

The parallel cable, used by the Lifeline program to perform high-speed data transfers, must be shielded, with the shield connected to ground (pin 25) at one or both ends. The Lifeline parallel cable has a 25-pin D-shell connector at each end. The cable may be up to 15 feet long, but the recommended length is two to three feet.

This cable must be custom-fabricated according to the following specification:

| \multicolumn{3}{c}{Parallel Cable} |
| --- | --- | --- |
| \multicolumn{3}{c}{DB-25 male to DB-25 male, <15 feet (4.5 meters) in length} |
| \multicolumn{3}{c}{Shielded} |
| Pin # Signals | Pin # | IBM Parallel Printer Port |
| 2 | 15 | (D0 ... ERROR#) |
| 3 | 13 | (D1 ... SLCT) |
| 4 | 12 | (D2 ... PE) |
| 5 | 10 | (D3 ... ACK#) |
| 6 | 11 | (D4 ... BUSY) |
| 10 | 5 | (ACK# ... D3) |
| 11 | 6 | (BUSY ... D4) |
| 12 | 4 | (PE ... D2) |
| 13 | 3 | (SLCT ... D1) |
| 15 | 2 | (ERROR# ... D0) |
| 25 | 25 | (GND ... GND) |
| \multicolumn{3}{l}{All other pins must be left unconnected at both ends.} |

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

Although the foregoing discussion emphasizes data transfer between two IBM-compatible personal computers, it should be noted that the scope of the inventions is not so limited. The innovations can also be applied to other computer architectures, such as Macintosh, Spare, or others.

In the presently preferred embodiment, the serial port is used only for program loading, and all data transfer uses the parallel port; but alternatively it would be possible to use the serial ports, if desired, for transfer of the disk image.

As will be recognized by those skilled in the art, the innovative concepts described in the present application can be modified and varied over a tremendous range of applications, and accordingly the scope of patented subject matter is not limited by any of the specific exemplary teachings given.

APPENDIX

A sample source code implementation is set forth, in the following appendix, to ensure the fullest possible compliance with the best mode requirements of US patent law. Although the following code does represent the state of this code as of the effective filing date of the present application, it must be noted that this specific example is still under development. It is expected that this code will later be modified to add functionality, improve performance, and possibly also to remove bugs. Thus, users are warned that the following example should be regarded as an engineering prototype rather than a finished product, and should be used only with great caution.

Sample Source Code Implementation - Main Module

Following is the source code of a program, named LIFELINE.C, which is the presently preferred embodiment of the software described above.

The following code is written in C, and is compatible with Turbo C++ V1.0 or later.

---

```c
#pragma inline
#include <stdio.h>
#include <dos.h>
#include <bios.h>
#include <stdlib.h>
#include <alloc.h>
#include <string.h>
#include <io.h>
typedef struct
{
    unsigned cyls;
    unsigned heads;
    unsigned secs;
    unsigned long bytes;
    unsigned buffer_bytes;
}
hd_parms;
typedef struct
{
    unsigned status;    // 0 = cancelled, 1 = OK, 2 = done
    unsigned cyl;
    unsigned head;
}
hd_header;
hd_parms ldisk,rdisk;
hd_header hdr;
void serial_init(void);
int serial_poll(void);
int serial_read_byte(void);
void serial_xmit_byte(int byte);
void serial_xmit_buffer(void far *buffer, unsigned int bytecnt);
void serial_xmit_string(void far *string);
void parallel_init(void);
int parallel_poll(void);
int parallel_read_byte(void);
void parallel_xmit_byte(int byte);
void send_buffer(void far *packbuff, void far *buffer, unsigned int bytecnt);
unsigned int receive_buffer(void far *buffer);
void write_handshake(int value);
const char version[] = "2.00";
unsigned char far *buffer;
unsigned char far *packbuff;
union REGS inregs,outregs;
char prog_filename[128],boot_filename[128];
int suggest_boot;
/*****************************/
void abend(int err_num)
```

```c
#define perr(x) fprintf(stderr,x);
    fprintf(stderr,"\nERROR LL%03u: ",err_num);
    switch(err_num)
        {
        case 1: perr("No command-line arguments accepted."); break;
        case 2: perr("Insufficient DOS memory.  Remove any TSR programs."); break;
        case 3: perr("Couldn't find LIFEBOOT.BIN.\n");
                perr("(You must copy the original disk-based file.)"); break;
        case 4: perr("Couldn't find/read program file."); break;
        case 5: perr("Requires DOS version 3.X or later."); break;
        case 6: perr("LIFELINE cannot read this system's hard disk."); break;
        case 7: perr("Local and remote hard disks are different sizes."); break;
        case 8: perr("Local hard disk is faulty or improperly formatted."); break;
        }
    fprintf(stderr,"\n%c",7);
    fcloseall();
    exit(err_num);
}
void locate(int x, int y)
{
    inregs.h.ah = 0x0f;
    int86(0x10,&inregs,&outregs);
    inregs.h.ah = 0x02;
    inregs.h.dh = y; inregs.h.dl = x; inregs.h.bh = outregs.h.bh;
    int86(0x10,&inregs,&outregs);
}
void curpos(int *x, int *y)
{
    inregs.h.ah = 0x0f;
    int86(0x10,&inregs,&outregs);
    inregs.h.bh = outregs.h.bh; inregs.h.ah = 0x03;
    int86(0x10,&inregs,&outregs);
    *x = outregs.h.dl; *y =outregs.h.dh;
}
void home(void)
{
    asm{
        mov ah,6; mov al,0; mov bh,07h;
        mov ch,0; mov cl,0; mov dh,25; mov dl,79;
        int 10h;
        }
    locate(0,0);
}
void center_string(char *str)
{
    int cx,cy;
    curpos(&cx,&cy);
    locate(((79-cx)/2) - (strlen(str)/2),cy);
    printf(str);
}
void tickwait(unsigned int ticks)
{
```

```
    unsigned long far *clk = (unsigned long far *) 0x0000046c;
    volatile unsigned long val;
    if (ticks==1) ticks=2;
    for (;ticks;--ticks)
        {
        val = *clk;
        while (val==*clk);
        }
}
/*****************************************/
unsigned read_far(char *filename)
{
    int file_handle;
    unsigned long file_length;
    asm{
        mov ax,3d00h; mov dx,filename; int 21h; jc error;
        mov file_handle,ax; mov bx,ax;
        mov ax,4202h; xor cx,cx; xor dx,dx; int 21h
        mov WORD PTR file_length+2,dx; mov WORD PTR file_length,ax
        mov ax,4200h; mov bx,file_handle; xor cx,cx; xor dx,dx; int 21h
        push ds; mov cx,WORD PTR file_length; mov bx,file_handle;
        mov dx,WORD PTR buffer; mov ds,WORD PTR buffer+2;
        mov ah,3fh; int 21h; pop ds;
        mov ah,3eh; mov bx,file_handle; int 21h;
        }
    return (unsigned) file_length;
error:
    return NULL;
}
/*********************************/
int xmit_request(void)
{
    unsigned long far *clk = (unsigned long far *) 0x0000046c;
    volatile unsigned long val;
    int state,done,i;
    if (parallel_poll()) return 0;   // remote trying to send or not online
    for (val=*clk,i=done=state=0;(i<3) && (!done);)
        {
        switch (state)
            {
            case 0:
                write_handshake(1); ++state; break;
            case 1:
                if (parallel_poll()) ++state; break;
            case 2:
                write_handshake(0); ++state; break;
            case 3:
                if (!parallel_poll()) ++state; break;
            case 4:
                write_handshake(1); ++state; break;
            case 5:
                if (parallel_poll()) ++state; break;
            case 6:
```

```
                write_handshake(0); ++state; break;
            case 7:
                if (!parallel_poll()) done=1; break;
            }
        if (val!=*clk) { val=*clk; i++; }
        }
    write_handshake(0);
    while (parallel_poll() && (!kbhit()));
    return done;
}
int recv_request(void)
{
    unsigned long far *clk = (unsigned long far *) 0x0000046c;
    volatile unsigned long val;
    int state,done,i;
    for (val=*clk,i=done=state=0;(i<3) && (!done);)
        {
        switch (state)
            {
            case 0:
                write_handshake(1); ++state; break;
            case 1:
                if (!parallel_poll()) ++state; break;
            case 2:
                write_handshake(0); ++state; break;
            case 3:
                if (parallel_poll()) ++state; break;
            case 4:
                write_handshake(1); ++state; break;
            case 5:
                if (!parallel_poll()) ++state; break;
            case 6:
                write_handshake(0); done=1; break;
            }
        if (val!=*clk) { val=*clk; i++; }
        }
    write_handshake(0);
    while (parallel_poll() && (!kbhit()));
    return done;
}
/*********************************/
void send_bootstrap(void)
{
    unsigned boot_len;
    if ((boot_len=read_far(boot_filename))==NULL) abend(3);
    serial_xmit_buffer(buffer,boot_len);
}
void send_exe(void)
{
    unsigned prog_len;
    if ((prog_len=read_far(prog_filename))==NULL) abend(4);
    send_buffer(packbuff,buffer,prog_len);
}
```

```
int wait_remote_prompt(int x, int r)
{                                        // Wait for receipt of r after sending x
    int i,done=0,cancel=0;
    unsigned long far *clk = (unsigned long far *) 0x0000046c;
    volatile unsigned long val;
    while (!done)
        {
        while (serial_poll()) serial_read_byte();
        serial_xmit_byte(x);
        for (val=*clk,i=0;(i<10) && (!done);)
            {
            if (serial_poll())
                if (serial_read_byte()==r) done=1;
```

What is claimed is:

1. A method, comprising the steps of:
   (a.) providing a first personal computer, comprising a first CPU, a first hard disk drive, from which data is desired to be copied, and a first parallel port;
   (b.) providing a second personal computer containing a second CPU, a second hard disk drive, onto which data is desired to be copied, and a second parallel port;
   (c.) connecting said first and second parallel ports together by a multi-strand cable;
   (d.) running a software process on said first CPU which reads out raw data from each respective individual sector of said first drive, compresses said raw data into substantially non-repeated bytes of compressed data, and transmits said compressed data through said first parallel port;
   (e.) running a software process on said second CPU which receives said compressed data through said second parallel port, decompresses said compressed data to reproduce said raw data, and writes said raw data into individual sectors of said second drive which exactly correspond to said respective sectors of said first drive; and
   (f.) continuing said steps (d.) and (e.), substantially simultaneously on said first and second CPUs, until substantially all of said first drive has been imaged onto said second drive.

2. The method of claim 1, wherein said multi-strand cable makes electrical connection between said first and second ports such that data transmission lines from said first port are routed into handshaking lines at said second port.

3. The method of claim 1, wherein said first and second CPUs are both microprocessors.

4. The method of claim 1, wherein said first and second computers are both at least downwardly compatible with the Industry Standard Architecture (ISA).

5. The method of claim 1, wherein said first computer also comprises a first serial port; and wherein said first process can branch, in accordance with user command input, to send said compressed data over said first serial port.

6. The method of claim 1, wherein said first drive presents a respective Integrated Drive Electronics (IDE) interface to said first CPU, and said second drive presents a respective Integrated Drive Electronics (IDE) interface to said second CPU.

7. The method of claim 1, wherein said second process checks drive size and parameters of said second disk, and does not overwrite any of the sectors of said second disk if the drive size and parameters of said second disk are not closely compatible with the drive size and parameters of said first disk.

8. The method of claim 1, wherein said second computer further comprises a third disk, which has more than three times the storage capacity of said second disk.

9. A method, comprising the steps of:
   (a.) providing a first personal computer, comprising a first CPU, a first hard disk drive, from which data is desired to be copied, and a first parallel port;
   (b.) providing a second personal computer containing a second CPU, a second hard disk drive, onto which data is desired to be copied, and a second parallel port;
   (c.) connecting said first and second parallel ports together by a multi-strand cable;
   (d.) running a software process on said first CPU which reads out raw data from each respective individual sector of said first drive, compresses said raw data into substantially non-repeated bytes of compressed data, and transmits said compressed data through said first parallel port;
   (e.) running a software process on said second CPU which receives said compressed data through said second parallel port, decompresses said compressed data to reproduce said raw data, and writes said raw data into individual sectors of said second drive which exactly corresponds to said respective sectors of said first drive, wherein said second process checks drive size and parameters of a second disk, and does not overwrite any of the sectors of the second disk if the drive size and parameters of said second disk are not identical to the drive size and parameters of said first disk; and
   (f.) continuing said steps (d.) and (e.), substantially simultaneously on said first and second CPUs, until substantially all of said first drive has been imaged onto said second drive.

10. A method, comprising the steps of:
    (a.) providing a first portable personal computer, comprising a first CPU, at least one input device, at least one output device, a first hard disk drive incorporating Integrated Drive Electronics (IDE) interface electronics, at least one battery connected to power said CPU under at least some conditions, a first serial port and a first parallel port;

(b.) providing a second personal computer containing a second CPU, a keyboard, a monitor, a second hard disk drive incorporating IDE interface electronics, a second serial port, and a second parallel port;

(c.) connecting said first and second parallel ports together by a multi-strand cable, which makes electrical connection between first and second ports such that data transmission lines from said first port are routed into handshaking lines at said second port;

(d.) running a software process on said first CPU which reads out raw data from each respective individual sector of said first drive, compresses said raw data into substantially non-repeated bytes of compressed data, and transmits in parallel said compressed data through said first parallel port and into said multi-strand cable;

(e.) running a software process on said second CPU which
  (i.) checks drive size and parameters of said second disk, and, IF said checking step indicates that the size and parameters of said second disk are closely compatible with the drive size and parameters of said first disk,
  (ii.) receives in parallel said compressed data from said multi-strand cable and through said second parallel port,
  (iii.) decompresses said compressed data to reproduce said raw data,
  (iv.) and writes said raw data into individual sectors of said second drive which exactly correspond to said respective sectors of said first drive; and (f.) continuing said steps (d.) and (e.), substantially simultaneously on said first and second CPUs, until substantially all of said first drive has been imaged onto said second drive.

11. The method of claim 10, wherein said first and second CPUs are both microprocessors.

12. The method of claim 10, wherein said first and second computers are both at least downwardly compatible with the Industry Standard Architecture (ISA).

13. The method of claim 10, wherein said first process can branch, in accordance with user command input, to send said compressed data over said first serial port.

14. The method of claim 10, wherein said second process checks drive size and parameters of said second disk, and does not overwrite any of the sectors of said second disk if the drive size and parameters of said second disk are not identical to the drive size and parameters of said first disk.

15. The method of claim 10, wherein said second computer further comprises a third disk, which has more than three times the storage capacity of said second disk.

16. A system, comprising:
a portable personal computer, comprising a CPU, at least one disk drive, a serial port, a parallel port and software, stored in a nonvolatile medium, which can control said CPU so that:
in response to a first user command sequence, said CPU executes instructions from said software to read out raw data from substantially all respective individual sectors of said drive, to compress said raw data into substantially non-repeated bytes of compressed data, and to transmit in parallel said compressed data through said parallel port;

in response to a second user command sequence, said CPU executes instructions from said software to receive in parallel data through said parallel port, to decompress said data according to a substantially predetermined algorithm to produce corresponding uncompressed data, and to overwrite said substantially all individual sectors of said drive with said decompressed data, without regard to the file structure of said drive.

17. The system of claim 16, wherein said nonvolatile medium is a floppy disk.

18. The system of claim 16, wherein said nonvolatile medium is a hard disk.

19. The system of claim 16, wherein said nonvolatile medium is a semiconductor memory.

20. The system of claim 16, wherein said portable personal computer is a laptop computer.

21. The system of claim 16, wherein, in response to a third user command input sequence, said CPU executes instructions from said software to read out raw data from each respective individual sector of said drive, to compress said raw data to produce compressed data, and to transmit said compressed data through said serial port.

22. The system of claim 16, wherein,
in response to a third user command input sequence, said CPU executes instructions from said software to read out raw data from each respective individual sector of said drive, to compress said raw data to produce compressed data, and to transmit said compressed data through said serial port; and wherein,
in response to a fourth user command input sequence, said CPU executes instructions from said software to receive data through said parallel port, to decompresses said data according to a substantially predetermined algorithm to produce corresponding decompressed data, and to overwrite the individual sectors of said drive with said decompressed data, without regard to the file structure of said drive.

23. The system of claim 16, wherein,
in response to a third user command input sequence, said CPU executes instructions from said software to read out raw data from each respective individual sector of said drive, to compress said raw data to produce compressed data, and to transmit said compressed data through said serial port; and wherein,
in response to a fourth user command input sequence, said CPU executes instructions from said software to receive data through said parallel port, to decompresses said data according to a substantially predetermined algorithm to produce corresponding decompressed data, and to overwrite the individual sectors of said drive with said decompressed data, without regard to the file structure of said drive; and wherein,
in response to a fifth user command input sequence, said CPU executes instructions from said software to send executable code for said software out through said serial port.

* * * * *